April 19, 1932.  F. A. BULLINGTON  1,854,979
FLAME CONTROL CYLINDER HEAD
Filed April 17, 1930

INVENTOR.
Frank A. Bullington
BY Alfred R. Fuchs
ATTORNEY.

Patented Apr. 19, 1932

1,854,979

UNITED STATES PATENT OFFICE

FRANK A. BULLINGTON, OF KANSAS CITY, MISSOURI, ASSIGNOR TO BULLINGTON ENGINE HEADS, OF KANSAS CITY, MISSOURI, A COMMON LAW TRUST CONSISTING OF HENRY C. TAMMEN, HOWARD P. TREADWAY, AND FRANK A. BULLINGTON

FLAME CONTROL CYLINDER HEAD

Application filed April 17, 1930. Serial No. 445,014.

My invention relates to cylinder heads for internal combustion engines and more particularly to flame control cylinder heads, which are particularly adapted for use in L-head or similar engines having valves at the side thereof.

It is a purpose of my invention to provide a cylinder head of the above mentioned character that is so constructed as to produce a dual or multiple ignition of the fuel in the main combustion chamber formed in said cylinder head, said ignition taking place at spaced points in said combustion chamber.

It is a further purpose of my invention to provide a main combustion chamber in said cylinder head that is made of such a form as to continuously and gradually converge from the portion thereof overlying the valves toward the opposite side of the cylinder and in which is arranged approximately symmetrically about a center line extending crosswise of the cylinder, or in other words, a line extending through the axis of the cylinder at a point substantially midway between the valves.

It is a further purpose of my invention to provide a cylinder head so formed that the flame produced therein subsequent to the ignition at the ignition means is controlled so as to obtain combustion that will not cause detonation or noisy operation of the engine with greater compression pressures than are commonly used, and which will produce a high efficiency of operation, said flame control means preferably comprising an ignition means located in a primary ignition space which may be an initial ignition pocket, and from which flame conduits or flame passages extend that lead to the main combustion space in said cylinder head, said conduits or passages preferably opening into said space at spaced points located respectively over the valves and over the cylinder chamber.

It is a further purpose of my invention to provide a cylinder head having such an initial ignition space or pocket and passages leading therefrom into the main combustion chamber at spaced points as described above, which is provided with a low wall portion between the portion of the combustion space over the valves and the portion of the combustion space over the cylinder to thus reduce the volume of the space between said openings and permit a wider spacing of said openings than might otherwise be the case, without producing a noisy operation of the engine.

It is a further purpose of my invention to provide a cylinder head of the above mentioned character in which the passages leading from the initial ignition means are provided with portions opening into the main combustion chamber in the cylinder head that are flared so as to increase the area over which propagation of flame takes place at the mouth of said passages, and to prevent undue projection of the flame to points that are undesirable in order to avoid advance burning of fuel in the remote portions of said combustion chamber in said cylinder head, after ignition has taken place at the initial ignition means.

It has been discovered that it is particularly desirable to provide means for spreading or distributing the flame transversely of the combustion space within the cylinder head, or in a direction transverse to a center line extending through the axis of the cylinder and a point midway between the valves. It is particularly desirable to provide distributing means for the flame at the mouth portion of the passage from the initial ignition means to the space over the piston that is so formed that the same is of greater extent on the side of said center line toward the inlet valve. Less detonation and higher efficiency can be produced, it has been discovered by experiment, by such an arrangement.

Other objects and advantages of my invention will appear as the description of the drawings proceeds. I desire to have it understood, however, that I do not intend to limit myself to the particular details of construction shown or described, but that I intend to include as part of my invention all such obvious changes and modifications as would occur to a person skilled in this art and as would fall within the scope of the claims.

Figure 1:
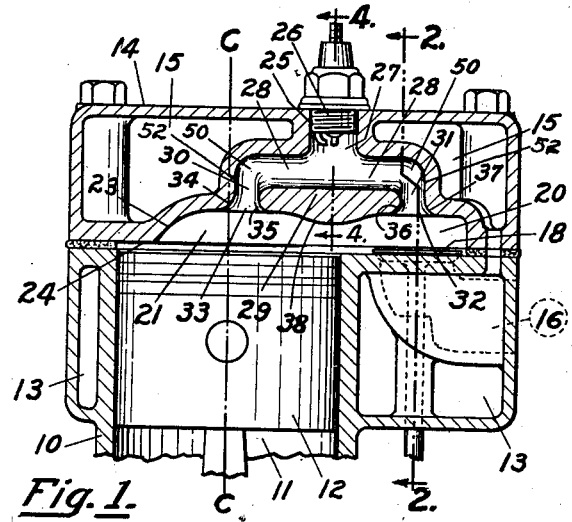
Fig. 1 is a vertical sectional view of the upper portion of a cylinder and cylinder head of my improved type, the lower portion of the cylinder being broken away.

Referring in detail to the drawings, in Figs. 1 to 4 inclusive a portion of a cylinder block is shown having the cylinder 10 providing a cylinder chamber 11, in which the piston 12 is adapted to reciprocate in the usual manner, said cylinder is provided with the usual water jacket providing a space 13 for cooling medium around the same, and a cylinder head 14 having the usual water jacket to provide the space 15 for cooling medium therein communicating with the space 13 in the cylinder with which the cylinmedium therein communicating with the der head cooperates. The cylinder block is provided with a pair of passages communicating with the cylinder chamber 11 through the combustion space provided in the cylinder head, said passages comprising an intake passage 16 and an exhaust passage 17, communication with the intake passage 16, being controlled by means of the intake valve 18 and with the exhaust passage by means of the exhaust valve 19. It will be noted that the valves 18 and 19 are located to one side of the cylinder, thus providing what is commonly known as an L-head engine.

The cylinder head is provided with a recess in the side thereof that faces the cylinder, said recess in the form shown in Figs. 1 to 4 inclusive comprising a relatively wide portion 20 overlying the valves 18 and 19 and a portion 21 overlying the cylinder, the portion 21 being narrower than the portion 20 and the side walls 22 of said recess converging from that portion thereof over the valves to that portion thereof over the cylinder to provide a recess elongated transversely of the cylinder and tapering from the relatively wide portion thereof overlying the valves to the end wall 23 thereof overlying the cylinder.

The end wall 23 preferably lies past the axis of the cylinder or more specifically between the axis and the side thereof most remote from the valves, but said recess does not extend entirely across the cylinder nor is it of such a size at the portion thereof overlying the cylinder as to be of a greater transverse dimension than or as wide as, the diameter of the cylinder, thus leaving a restricting wall portion 24 overlying the cylinder. The portion thereof overlapping the cylinder is of a shape approaching that of a crescent, as will be evident from Fig. 3. The recess in the cylinder head preferably is symmetrically arranged relative to a line drawn through the axis of the cylinder and lying midway between the axis of the valves 18 and 19, such a line being indicated by the section line 1—1 in Fig. 3.

The cylinder head is further provided with a spark plug receiving opening 25 threaded to receive the spark plug 26. Said opening may be of any size and the terminals of the spark plug may extend into the same to any distance found desirable, but preferably the same are located in the inner unthreaded part of said opening 25, which constitutes a primary ignition pocket 27. In the form shown in Figs. 1 to 4 inclusive a transversely extending flame passage 28 is provided, which is in free communication with the pocket 27 and in spaced relation to the above described recess that faces and is open to the cylinder chamber 11, a wall portion 29 being provided between said passage 28 and said recess in the inner face of the cylinder head. The transversely extending flame passage 28 is provided with curved portions 50 at the opposite ends thereof, and with end portions 30 and 31 extending substantially parallel to the axis of the cylinder or parallel to the line C—C in Fig. 1, which line represents said axis. The walls of the end portions 30 and 31 of said passage have vertical wall portions 52 therein so located as to diffuse and direct the igniting flame downwardly toward the recess portions 20 and 21.

The end portions 30 and 31 of the passage 28 that establishes communication between the portion 20 of the recess in the cylinder head overlying the valves, the portion 21 of the recess in the cylinder head overlying the cylinder and the ignition means 26, opens into the portion 20 of said recess through an opening 32 elongated transversely of the recess in the cylinder head, or in such a direction as to overlie both the valve 18 and the valve 19 and located symmetrically relative to the line extending midway between the valves. The portion 30 of the flame passage in the cylinder head terminates in an opening 33 elongated transversely of the recess in the cylinder head, and of a slot-like form. It will be noted that the opening 33 is of greater extent or area on the side of the line 1—1 on which the inlet valve lies, as shown at 51, thus providing a greater portion of said opening over the half of the cylinder lying on the side of said line 1—1, on which said inlet valve lies. It will also be noted that the opening 33 lies between the line A—A, which extends through the axis of the cylinder and is approximately perpendicular to the line 1—1, and the valves, or over that half of the cylinder lying on the side of the line A—A toward said valves or nearest the valves, but closely adjacent the center or axis of the cylinder. It will also be noted that the walls of the openings are flared or rounded where the same lead into the recess forming the main combustion chamber and facing the cylinder and valves, as indicated at 34, 35, 36 and 37.

The elongation of said openings provides for better control and distribution of flame and flaring of the openings also aids in this. Said elongation and flaring of the openings 32 and 33 further serve to effect diffusion of flame from the openings 32 and 33, and to diffuse the expulsive forces created by the expansion of gases therein during combustion, to the extent that the flame is not projected into the remote portions of the combustion space in the recess formed in the cylinder head, but is caused to spread more uniformly in all directions than would otherwise be possible and avoid objectionable detonation and other noises that might be created because of burning of the contents of the main combustion chamber formed in the recess in the cylinder due to ignition thereof at points remote from each other.

The passage or passages formed in the cylinder head by the transverse passage 28 and the end portions 30 and 31 thereof, as well as the pocket 27 form what might be termed a primary ignition space, in view of the fact that the fuel mixture is ignited at the spark plug 26 and the passages in the cylinder head establish communication between said ignition means and the portions of the recess in the cylinder head overlying the valves and overlying the cylinder. The openings 32 and 33 are so arranged as to provide for substantially equal propagation of flame in the main combustion chamber in the cylinder head formed by the recess therein in both directions from said openings in a direction parallel to the length of the recess, or parallel to the line 1—1, while the elongated openings 32 and 33 are arranged with their greatest length disposed substantially transversely of the line 1—1, or transversely of the direction of greatest length of said recess.

It has been discovered by experiment with such cylinder heads as described herein, that due to the general fixed proportions of a combustion chamber of an L-head engine, my invention is of greatest advantage if the distance between the openings 32 and 33 is less than the distance between the center line of the valves, and a line drawn through the center of the cylinder or axis of the cylinder extending parallel thereto, and that the space that will be existing between said openings when the cylinder head is in place on the cylinder is of the smallest possible volume that may be used without reducing the cross-sectional area of this space to such an extent as to interfere with the free passage of gases between the valves and the cylinder chamber. In order to reduce this space as much as possible an undulation or deflection is provided in the wall of the recess facing the cylinder at 38 to provide a wall portion projecting toward the cylinder, which may be referred to as a low wall portion 38 between the openings 32 and 33. In order to reduce any sound effect or detonation that might be caused due to the provision of such a wall portion 38, the same must be located with its point of closest approach to the cylinder block approximately midway between the openings 32 and 33 so that the smallest cross-sectional area created between the cylinder block and piston and said cylinder head between said openings during the time that combustion takes place in said cylinder head, will lie midway between said openings. Said point is also located substantially over the point where the cylinder chamber 11 approaches nearest the valves 18 and 19.

Figure 2:
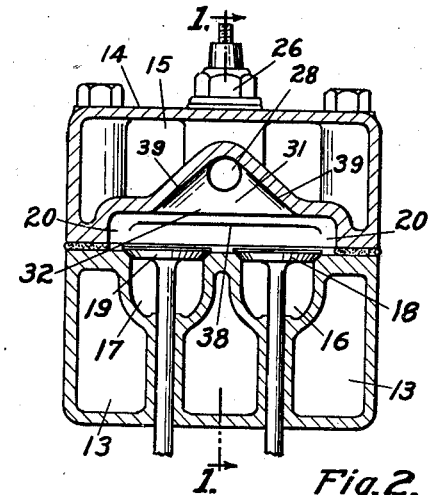
Fig. 2 is a section taken on the line 2—2 of Fig. 1.
Figure 3:
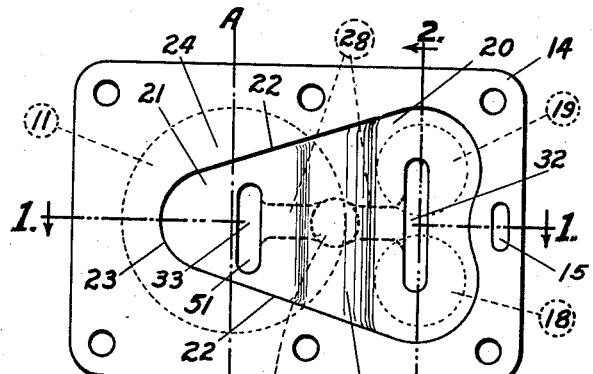
Fig. 3 is a bottom plan view of the cylinder head shown in Figs. 1 and 2 with the relative location of the cylinder and valves to said head shown in dotted lines.
Figure 4:
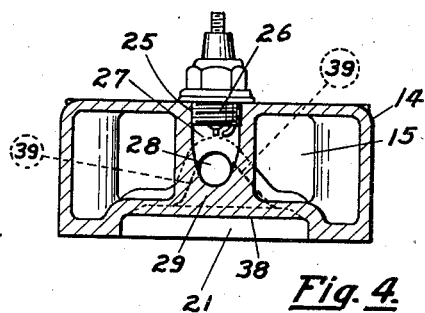
Fig. 4 is a section taken on the line 4—4 of Fig. 1.

The walls of the passage 30 or 31 also flare toward the recess forming the main combustion chamber in the cylinder as will be evident from Figs. 2 and 4, said flaring walls being indicated by the numeral 39, and aid in the spreading or distribution of the flame from the passages 30 and 31 into the portions 20 and 21 of the recess in the cylinder, overlying respectively the valves of the cylinder, in a direction crosswise of said recess.

It will also be noted that the flame passage or initial combustion space described above serves as an auxiliary passage for fresh fuel mixture during the intake stroke, and as an auxiliary passage for the exhaust gases during the exhaust stroke. The drawing of the fresh fuel through said flame passage thus placing fresh fuel mixture in close proximity to and around the ignition means.

Figure 5:
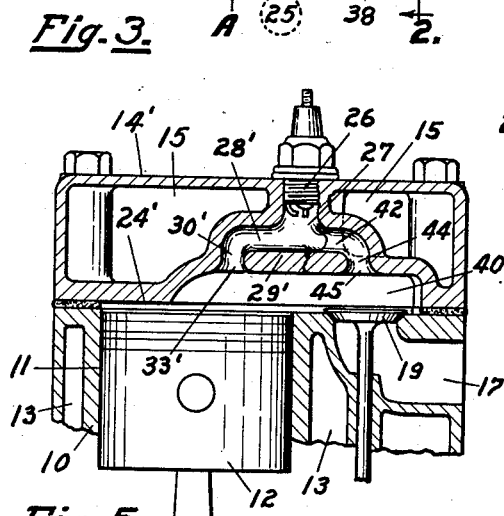
Fig. 5 is a vertical sectional view of the upper portion of a cylinder and a modified form of my improved cylinder head, the section being taken substantially on the line 5—5 of Fig. 6 through said cylinder head.
Figure 6:
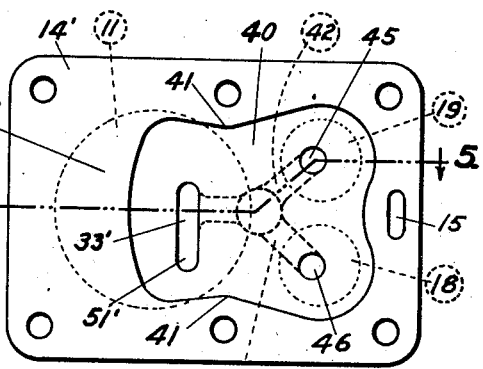
Fig. 6 is a bottom plan view of the form of cylinder head shown in Fig. 5 with the location of the cylinder and valves relative thereto, when said cylinder head is in position, shown in dotted lines therein.

In Figs. 5 and 6 a slightly modified form of cylinder head 14' is shown. The principal difference between the cylinder head 14' and the cylinder head 14 being in the shape of the main combustion chamber recess therein, and in the arrangement of flame propagation passages in the same. The parts in Figs. 5 and 6 that correspond to the parts shown in 1 to 4 inclusive that have not been changed in any way are indicated by the same reference numbers as in Figs. 1 to 4 inclusive.

The recess 40 forming the main combustion chamber, in the form shown in Figs. 5 and 6 has a portion thereof overlying the valves and a portion thereof overlying the cylinder, but is much more nearly of uniform width than in the form shown in Figs. 1 to 4 inclusive, having the side walls thereof inclined toward the points 41, which indicate the narrowest portion of said recess and thus providing a recess that overlies substantially one half the cylinder on the side thereof toward the valves, being freely open to substantially the entire half of said cylinder on the side thereof nearest the said valves. The recess 40 further does not have any low wall portion, such as the wall portion 38 in Figs. 1 to 4 inclusive, as in this form the openings into the space over the cylinder and over the valves are closer together and a reduction in the volume of the space between said openings is not of particular necessity. The transversely extending portion of the flame propagation passage in this form of the invention is provided with a portion 28' that extends substantially in the manner previously described in connection with Figs. 1 to 4 inclusive, and terminates in an opening 33' similar to the opening 33 that leads from the end portion 30' of said passage overlying the cylinder, and is provided with branches 42 and 43 that diverge from the passage 28', or from the ignition pocket 27 in a direction toward that portion of the cylinder head overlying the valve 19 and the valve 18 and terminate in portions 44 that extend substantially parallel to the axis of the cylinder and terminate in the openings 45 and 46, which are slightly flared, which will be evident from Fig. 5, and which overlie the valves 19 and 18 respectively. Thus, the principal difference between the forms shown in Figs. 1 to 4 inclusive and Figs. 5 and 6 is that while both have flame passages that have openings overlying the cylinder and both of the valves, in the form shown in Figs. 1 to 4 inclusive a single opening 32 overlies both of the valves, while in the form shown in Figs. 5 and 6 the passage itself is divided and a pair of openings is provided overlying said valves.

Having thus described my invention, what I claim and desire to secure by United States Letters Patent is:—

1. In an internal combustion engine, a cylinder, valves at one side of said cylinder, a cylinder head cooperating with the cylinder and ignition means in the cylinder head, said cylinder head having a recess therein extending over said cylinder and over said valves and providing the major portion of the combustion space in said cylinder head communicating with the cylinder, and said cylinder head having passages therein extending from said ignition means into the portion of said recess over said cylinder and into the portion of said recess over said valves.

2. In an internal combustion engine, a cylinder, valves at one side of said cylinder, a cylinder head cooperating with the cylinder, said cylinder head having an ignition pocket therein and ignition means in said pocket, said cylinder head having a recess therein extending over said cylinder and over said valves and providing combustion space in said cylinder head communicating with the cylinder, and said cylinder head having passages therein extending from said ignition pocket into the portion of said recess over said cylinder and into the portion of said recess over said valves, said recess having a closed ceiling wall except for said passages.

3. In an internal combustion engine, a cylinder, valves at one side of said cylinder, and a cylinder head cooperating with said cylinder, said cylinder head having a recess therein extending over said cylinder and over said valves and providing combustion space in said cylinder head communicating with the cylinder and said head having a flame passage therein spaced from said recess and having end portions extending substantially parallel with the axis of said cylinder and opening into said recess over said valves and over said cylinder.

4. In an internal combustion engine, a cylinder, valves at one side of said cylinder, and a cylinder head cooperating with said cylinder, said cylinder head having a recess therein extending over said cylinder and over said valves and providing combustion space in said cylinder head communicating with the cylinder, the portion of said recess extending over the cylinder being in unrestricted communication with said cylinder, and said head having a flame passage therein spaced from said recess and having end portions opening into said recess over said valves and over said cylinder, the end portion thereof over said valves being located substantially in midposition relative thereto.

5. In an internal combustion engine, a cylinder, valves at one side of said cylinder, and a cylinder head cooperating with said cylinder, said cylinder head having a recess therein extending over said cylinder and over said valves and providing combustion space in said cylinder head communicating with the cylinder and said head having a flame passage therein spaced from said recess and having end portions opening into said recess over said valves and over said cylinder, the opening over said valves being elongated to overlap both said valves.

6. In an internal combustion engine, a cylinder, valves at one side of said cylinder, and a cylinder head cooperating with said cylinder, said cylinder head having a recess therein extending over said cylinder and over said valves and providing combustion space in said cylinder head communicating with the cylinder and said head having a flame passage therein spaced from said recess and having end portions opening into said recess over said valves and over said cylinder, the end portion thereof over the cylinder opening into the recess at a point near the axis of said cylinder.

7. In an internal combustion engine, a cylinder, values at one side of said cylinder, and a cylinder head cooperating with said cylinder, said cylinder head having a recess therein extending over said cylinder and over said valves and providing combustion space in said cylinder head communicating with the cylinder, and said head having a flame passage therein spaced from said recess and having end portions opening into said recess over said valves and over said cylinder, the end portion thereof over the cylinder opening into the recess at a point near the axis of said cylinder, but over that side of the cylinder nearest the valves.

8. In an internal combustion engine, a cylinder, valves at one side of said cylinder, and a cylinder head cooperating with said cylinder, said cylinder head having a recess therein extending over said cylinder and over said valves and providing combustion space in said cylinder head communicating with the cylinder, and said head having a flame passage therein spaced from said recess and having end portions opening into said recess over said valves and over said cylinder, the end portion thereof over the cylinder lying adjacent the center of said cylinder and substantially on a line extending through the axis of the cylinder and midway between the axes of the valves.

9. In an internal combustion engine, a cylinder, valves at one side of said cylinder, and a cylinder head cooperating with said cylinder, said cylinder head having a recess therein extending over said cylinder and over said valves and providing combustion space in said cylinder head communicating with the cylinder, and said head having a flame passage therein spaced from said recess, and having end portions opening into said recess over said valves and over said cylinder, the end portion thereof over the cylinder lying substantially on a line extending through the axis of the cylinder and midway between the axes of the valves, the opening over said cylinder having the greater portion thereof lying to one side of said line.

10. In an internal combustion engine, a cylinder, inlet and exhaust valves at one side of said cylinder, and a cylinder head cooperating with said cylinder, said cylinder head having a recess therein extending over said cylinder and over said valves and providing combustion space in said cylinder head communicating with the cylinder and said head having a flame passage therein spaced from said recess and having end portions opening into said recess over said valves and over said cylinder, the end portions thereof over the cylinder and valves lying substantially on a line extending through the axis of the cylinder and midway between the axes of the valves, at least one of said openings having the greater portion thereof lying on the inlet valve side of said line.

11. In an internal combustion engine, a cylinder, a pair of valves at one side of said cylinder, a cylinder head cooperating with said cylinder and ignition means in said head, said cylinder head having a recess therein extending over said cylinder and over said valves and having flame passages in said head extending from said ignition means and opening into said recess over said cylinder and over both said valves.

12. In an internal combustion engine, a cylinder, valves at one side of said cylinder, a cylinder head cooperating with said cylinder, and ignition means in said head, said cylinder head having a recess therein overlying said valves and extending over said cylinder and having passages in said head extending from said ignition means and opening into the portion of said recess over said valves and into the portion of said recess over said cylinder, said recess being elongated in a direction transverse to the cylinder and said passages being arranged to provide substantially equal propagation of flame in said recess in both directions from said openings lengthwise of said recess.

13. In an internal combustion engine, a cylinder, valves at one side of said cylinder, a cylinder head cooperating with said cylinder, and ignition means in said head, said cylinder head having a recess therein overlying said valves and extending over said cylinder and having passages in said head extending from said ignition means and opening into the portion of said recess over said valves and into the portion of said recess over said cylinder, said recess being elongated in a direction transverse to the cylinder and the openings into said recess from said passages being elongated transversely of the length of said recess.

14. In an internal combustion engine, a cylinder, valves at one side of said cylinder, a cylinder head cooperating with said cylinder, and ignition means in said head, said cylinder head having a recess therein overlying said valves and extending over said cylinder and having passages in said head extending from said ignition means and opening into the portion of said recess over said valves and into the portion of said recess over said cylinder, said recess being elongated in a direction transverse to the cylinder and the distance between the openings into said recess from said passages being less than the distance between the axis of the cylinder and the center of the valves.

15. In an internal combustion engine, a cylinder, valves at one side of said cylinder, a cylinder head cooperating with the cylinder and ignition means in the cylinder head, said cylinder head having a recess therein extending over said cylinder and over said valves and providing combustion space in said cylinder head communicating with the cylinder, and said cylinder head having passages therein extending from said ignition means into the portion of said recess over said cylinder and into the portion of said recess over said valves, said cylinder head having a low wall portion between the openings from said passages into said recess.

16. In an internal combustion engine, a cylinder, valves at one side of said cylinder, a cylinder head cooperating with the cylinder and ignition means in the cylinder head, said cylinder head having a recess therein extending over said cylinder and over said valves and providing combustion space in said cylinder head communicating with the cylinder, and said cylinder head having passages therein extending from said ignition means into the portion of said recess over said cylinder and into the portion of said recess over said valves, said cylinder head having a low wall portion substantially midway between the openings from said passages into said recess.

17. In an internal combustion engine, a cylinder, a pair of valves at one side of said cylinder, a cylinder head cooperating with said cylinder and ignition means in said head, said cylinder head having a recess therein extending over said valves and over said cylinder from the side thereof adjacent said valves across the axis thereof and having flame passages in said head extending from said ignition means and opening into said recess over said cylinder and over said valves, the opening over the valves being adjacent a point midway between said valves.

18. In an internal combustion engine, a cylinder, valves at one side of said cylinder, and a cylinder head cooperating with said cylinder, said cylinder head having a recess therein extending over said cylinder and over said valves and providing combustion space in said cylinder head communicating with the cylinder and said head having a flame passage therein spaced from said recess and having end portions opening into said recess over said valves and over said cylinder, said end portions having flame deflecting wall portions therein.

19. In an internal combustion engine, a cylinder, valves at one side of said cylinder, and a cylinder head cooperating with said cylinder, said cylinder head having a recess therein extending over said cylinder and over said valves and providing combustion space in said cylinder head communicating with the cylinder and said head having a flame passage therein spaced from said recess and having end portions opening into said recess over said valves and over said cylinder, said end portions of said passage being formed to provide flame diffusion means at the ends of said passage.

20. In an internal combustion engine, a cylinder, valves at one side of said cylinder, a cylinder head cooperating with the cylinder and ignition means in the cylinder head, said cylinder head having a recess therein extending over said cylinder and over said valves and providing combustion space in said cylinder head communicating with the cylinder all of the portion of said recess over the cylinder having unrestricted communication with said cylinder, said recess having side walls converging from the portions over the valves toward the cylinder, and said cylinder head having passages therein extending from said ignition means into the portion of said recess over said cylinder and into the portion of said recess over said valves.

21. In an internal combustion engine, a cylinder, valves at one side of said cylinder, a cylinder head cooperating with the cylinder, said cylinder head having a recess therein overlying said valves and overlapping said cylinder, ignition means in said cylinder head, said cylinder head having passages therein extending from said ignition means into the portion of said recess overlying the valves and into the portion of said recess overlapping the cylinder, said recess being open on the side thereof facing the cylinder and being otherwise closed except for said passages.

22. In an internal combustion engine, a cylinder, valves at one side of said cylinder and a cylinder head cooperating with the cylinder having combustion space therein consisting of a recess overlying the valves and having a portion over the cylinder, the portion of said recess over the cylinder being in open unrestricted communication therewith, an ignition pocket and passages connecting said ignition pocket with the portions of said recess over said cylinder and overlying said valves.

In testimony whereof, I hereunto subscribe my name this 11th day of April 1930.

FRANK A. BULLINGTON.